(12) United States Patent
Solem et al.

(10) Patent No.: US 8,064,685 B2
(45) Date of Patent: Nov. 22, 2011

(54) 3D OBJECT RECOGNITION

(75) Inventors: Jan Erik Solem, Malmö (SE); Fredrik Kahl, Listerby (SE)

(73) Assignee: Apple Inc., Cupertino, CA (US)

( * ) Notice: Subject to any disclaimer, the term of this patent is extended or adjusted under 35 U.S.C. 154(b) by 976 days.

(21) Appl. No.: 11/201,419

(22) Filed: Aug. 11, 2005

(65) Prior Publication Data

US 2006/0039600 A1  Feb. 23, 2006

Related U.S. Application Data

(60) Provisional application No. 60/603,266, filed on Aug. 23, 2004.

(30) Foreign Application Priority Data

Aug. 19, 2004 (SE) ...................... 0402048

(51) Int. Cl.
*G06K 9/00* (2006.01)
(52) U.S. Cl. .................. 382/154; 382/118; 382/285
(58) Field of Classification Search .................. 382/154, 382/118, 285
See application file for complete search history.

(56) References Cited

U.S. PATENT DOCUMENTS

| | | | |
|---|---|---|---|
| 6,434,278 B1 * | 8/2002 | Hashimoto | 382/285 |
| 6,556,196 B1 | 4/2003 | Blanz et al. | |
| 6,775,397 B1 * | 8/2004 | Hamalainen | 382/118 |
| 6,879,946 B2 * | 4/2005 | Rong et al. | 703/2 |
| 7,227,981 B1 * | 6/2007 | Fleute et al. | 382/132 |
| 7,421,097 B2 * | 9/2008 | Hamza et al. | 382/118 |
| 2003/0097219 A1 * | 5/2003 | O'Donnell et al. | 702/19 |
| 2003/0123713 A1 * | 7/2003 | Geng | 382/118 |
| 2003/0160786 A1 * | 8/2003 | Johnson | 345/419 |
| 2005/0027492 A1 * | 2/2005 | Taylor et al. | 703/2 |
| 2005/0226509 A1 * | 10/2005 | Maurer et al. | 382/190 |
| 2006/0120589 A1 * | 6/2006 | Hamanaka | 382/154 |

FOREIGN PATENT DOCUMENTS

| | | |
|---|---|---|
| EP | 1 039 417 A1 | 9/2000 |
| WO | WO 00/55814 | 9/2000 |
| WO | 01/35326 A1 | 5/2001 |
| WO | 02/097720 A1 | 12/2002 |
| WO | 02/103618 A1 | 12/2002 |
| WO | WO 2006/019350 | 2/2006 |

OTHER PUBLICATIONS

Blanz, Volker et al., Face Recognition Based on Fitting a 3D Morphable Model, (Sep. 2003), IEEE Transactions on Pattern Analysis and Machine Intelligence, vol. 25, No. 9, pp. 1063-1074.

Cootes, T.F., et al., Active Shape Model Search Using Local Grey-Level Models: A Quantitative Evaluation, (1993), Proc. British Machine Vision Conference, pp. 639-648.

(Continued)

*Primary Examiner* — Vu Le
*Assistant Examiner* — Michael Vanchy, Jr.
(74) *Attorney, Agent, or Firm* — Fish & Richardson P.C.

(57) ABSTRACT

A method, device, system, and computer program for object recognition of a 3D object of a certain object class using a statistical shape model for recovering 3D shapes from a 2D representation of the 3D object and comparing the recovered 3D shape with known 3D to 2D representations of at least one object of the object class.

26 Claims, 5 Drawing Sheets

OTHER PUBLICATIONS

Cootes T.F., et al., View-based Active Appearance Models, (2002), Image and Vision Computing, vol. 20, pp. 657-664.

Zhao, W., Face Recognition: A Literature Survey, National Institute of Standards and Technology, pp. 1-65.

European Communication dated May 13, 2009.

Kristen Grauman, et al. "*Inferring 3D Structure with a Statistical Image-Based Shape Model*", Proceedings of the Ninth IEEE International Conference on Computer Vision (ICCV'03), (Apr. 2003) pp. 641-648, 2003.

Baback Moghaddam, et al. "*Model-Based 3D Face Capture with Shape-from-Silhouettes*", Proceedings of the IEEE International Workshop on Analysis and Modeling of Faces and Gestures (AMFG'03), (Mar. 2003), pp. 1-8, 2003.

Kristen Grauman, et al. "*A Bayesian Approach to Image-Based Visual Hull Reconstruction*", Proceedings of the 2003 IEEE Computer Society Conference on Computer Vision and Pattern Recognition, (CVPR'03), pp. 1-8, 2003.

Kristen Lorraine Grauman, "*A Statistical Image-Based Shape Model for Visual Hull Reconstruction and 3D Structure Inference*", Submitted to the Department of Electrical Engineering and Computer Science in partial fulfillment of the requirements for the degree of Master of Science in Computer Science and Engineering at the Massachusetts Institute of Technology, Jun. 2003, pp. 1-72.

A. Lanitis, et al., "*An Automatic Face Identification System Using Flexible Appearance Models*", Department of Medical Biophysics, University of Manchester, (1994), pp. 65-74.

\* cited by examiner

3D OBJECT RECOGNITION

PRIORITY STATEMENT

This U.S. non-provisional application claims benefit of priority under 35 U.S.C. §119 of Swedish Patent Application No. 0402048-3, filed on Aug. 19, 2004, and U.S. Provisional Application No. 60/603,266 filed on Aug. 23, 2004, the entire contents of both of which are incorporated herein by reference.

FIELD OF THE INVENTION

The present invention relates to automated object recognition and in particular to automated object recognition of 3D objects using statistical shape information.

BACKGROUND OF THE INVENTION

There exist extremely reliable methods for personal identification using biometric data such as e.g. fingerprints, retinal patterns or similar unique features of the subject that rely on the cooperation of the subject. Face recognition may be an effective way of identifying a person without the cooperation or knowledge of the person. There are two main general problems for a face recognition system; identifying a person, i.e. determine the identity from images, and verifying the identity of a person, i.e. to certify that the person is who he/she claims to be. Specific applications are e.g. immigration, ID-cards, passports, computer logon, intranet security, video surveillance and access systems. The present invention aims at increasing the performance and efficiency of such systems using geometric information available through the use of statistical shape models.

In the area of statistical shape models, the invention is related to the Active Shape Models (ASM), introduced by Cootes and Taylor, ([1]: Cootes T. F. and Taylor C. J, *Active Shape Model Search using Local Grey-level Models: A Quantitative Evaluation*, British Machine Vision Conference, p. 639-648, 1993). One distinction is that ASM have been used for inferring 2D shape from 2D observations or 3D shape from 3D observations whereas the invention uses 2D observations, i.e. images, to infer 3D shape. Also the observations are from multiple views (one or more imaging devices), something that is not handled in standard ASM. Cootes and Taylor have a number of patents in the area, the most relevant are (WO02103618A1—Statistical Model) where parameterisation of 2D or 3D shapes are treated, (WO0135326A1—Object Class Identification, Verification or Object Image Synthesis) where an object class is identified in images and (WO02097720A1—Object Identification) in which objects are identified using modified versions of ASM and related techniques. Also related is Cootes et al. ([2]: Cootes T. F., Wheeler G. V, Walker K. N and Taylor C. J., *View-based Active Appearance Models*, Image and Vision Computing, 20(9-10), p. 657-664, 2002.) where multi-view models are used but no explicit or consistent 3D data is contained in the model. There are also methods for deforming a 3D model of the object to fit the 2D projections of the object in the images such as in Blanz and Vetter ([3]: Blanz V. and Vetter T., *Face Recognition Based on Fitting a 3D Morphable Model*, IEEE Trans. on Pattern Analysis and Machine Intelligence, 25(9), p. 1063-1073, 2003.). These methods are very computationally expensive and often require manual intervention. Related patents are U.S. Pat. No. 6,556,196/EP1039417 (Method and apparatus for the processing of images) which describes a method for morphing a 3D model so that it will be a 3D representation of the object in the image by minimizing the projection error in the image.

One common problem for image based recognition is detecting the 2D shape of the object in the image, i.e. finding the relevant image region. Recent methods for detecting objects in images usually involve scanning the whole image at different scales for object specific image patterns and then using a classifier to decide if the region is relevant or not. The latest developments suggest the use of Support Vector Machines (SVM) for this task. A key element is the extraction of image features, i.e. parts of the image such as corners, edges and other interest points. This is usually done using correlation based schemes using templates or edge based methods using image gradients. For an overview of methods for face detection and feature extraction, cf. Zhao and Chellappa ([4]: Zhao W., Chellappa R., Rosenfeld A and Phillips P. J, *Face Recognition: A Literature Survey*, Technical report CAR-TR-948, 2000.) and the references therein. In [4] a review of current image based methods for face recognition is also presented.

When using image based methods for identification and verification there are two major problems, illumination variation and pose variation. Illumination variation will affect all correlation based methods where parts of images are compared since the pixel values vary with changing illumination. Also specular reflections can give rise to high changes in pixel intensity. Pose variation occurs since the projection in the image can change dramatically as the object rotates. These two problems have been documented in many face recognition systems and are unavoidable when the images are acquired in uncontrolled environments. Most of the known methods fail to handle these problems robustly.

The illumination problem is handled by the invention since no image correlation or comparison of image parts is performed. Instead features such as corners which are robust to intensity changes are computed, which make the shape reconstruction, to a large extent, insensitive to illumination and specular reflections. The invention handles the pose problem by using any number of images with different pose for training the statistical model. Any subset of the images, as few as a single image, can then be used to infer the 3D shape of the object.

SUMMARY OF THE INVENTION

The invention consists of a statistical model of the shape variations in a class of objects relating the two-dimensional (2D) projection in images to the three-dimensional (3D) shape of the object and the use of the 3D shape information for identification or verification of the object. Furthermore, the present invention relates to an image processing device or system for implementing such a method. The process is fully automatic and may be used e.g. for biometric identification from face images or identification of objects in for instance airport security X-ray images. The recovered 3D shape is the most probable shape consistent with the 2D projections, i.e. the images. The statistical model needs a bank of data, denoted training data, where the 3D positions of the image features are known, in order to learn the parameters of the model. Such data sampling can be done using e.g. binocular or multi-view stereo or range scanners. Once the model parameters are learned, the 3D shape can be computed using one or several images. The 3D shape is then used, by means of the presented invention together with the 2D image data, to identify or verify the object as a particular instance of the object class, e.g. the face belonging to a certain individual. A positive (or negative) identification initiate proper action by means of the presented innovation.

In a preferred embodiment of the invention, a method for object recognition of a three dimensional (3D) object is presented, the method comprising the steps of:
- obtaining at least one two dimensional (2D) representation of the object;
- detecting image features in the obtained 2D representation;
- recovering a highly probable 3D shape of the object of a certain object class consistent with 2D images of the object using at least one obtained image where 2D features are detected and using a learned statistical multi-view shape model of the shape variation; and
- comparing the recovered 3D shape with a reference representation of at least one object of the object class.

In the method, the recovered 3D shape may be a complete surface model.

Still in the method, the complete surface model may be inferred from 2D or 3D features.

In another aspect of the method according to the present invention, the object class may contain non-rigid objects and the statistical shape model may be learned using 2D and 3D data specific for possible deformations of the objects in the non-rigid object class.

The method may further comprise the step of identifying an individual object of an object class or aiding in the identification of an individual object using the recovered 3D shape.

The method may yet further comprise the step of verifying the identity of an individual object of an object class or aiding in the verification of the identity of an individual object using the recovered 3D shape.

The method may further comprise the step of: fitting a surface to the recovered 3D shape using a learned statistical shape model for the surface of the object in order to regularize the surface shape in a manner specific for the object class.

In the method the object may be one or several of: a human face, a human body, inner organ(s) of a human body, blood vessel, animal, inner organs of an animal, a tumor, manufactured product(s) from an industrial process, a vehicle, an aircraft, a ship, military object(s).

In the method the reference representation may be stored in at least one of a non-volatile memory, database server, and personal identification card.

In another embodiment of the present invention, a device for object recognition of a three dimensional (3D) object is presented, comprising:
- means for obtaining at least one two dimensional (2D) representation of the object;
- means for detecting image features in the obtained 2D representation;
- means for recovering a highly probable 3D shape of the object of a certain object class consistent with 2D images of the object (607) using one or more images where 2D features are detected and using a learned statistical multi-view shape model of the shape variation; and
- means for comparing the recovered 3D shape with a reference representation of at least one object of the object class.

In the device the recovered 3D shape may be a complete surface model and the complete surface model may be inferred from 2D or 3D features.

In the device the object class may contain non-rigid objects and the statistical shape model may be learned using 2D and 3D data specific for possible deformations of the objects in the non-rigid object class.

The device may further comprise means for identifying an individual object of an object class or aiding in the identification of an individual object using the recovered 3D shape.

The device may still further comprise means for verifying the identity of an individual object of an object class or aiding in the verification of the identity of an individual object using the recovered 3D shape.

The device may further comprising means for: fitting a surface to the recovered 3D shape using a learned statistical shape model for the surface of the object in order to regularize the surface shape in a manner specific for the object class.

In the device the object may be one or several of: a human face, a human body, inner organ(s) of a human body, blood vessel, animal, inner organs of an animal, a tumor, manufactured product(s) from an industrial process, a vehicle, an aircraft, a ship, military object(s).

In the device the recovered 3D shapes of blood vessels or organs recovered from 2D projections, e.g. using X-ray imaging may be used for navigating steerable catheters or aiding physicians by displaying the recovered 3D shape.

The recovered 3D shapes of facial features may be used in the device to identify or to verify an identity of an individual in an access control system or security system, resulting in an acceptance or rejection of the individual.

The device may further comprise an interface for communicating with a personal identification card wherein the reference representation is stored.

Yet another embodiment of the present invention, a computer program stored in a computer readable storage medium and executed in a computational unit for object recognition of a three dimensional (3D) object is presented, comprising:
- an instruction set for obtaining at least one externally acquired two dimensional (2D) representation of the object;
- an instruction set for detecting image features in the obtained 2D representation;
- an instruction set for recovering a highly probable 3D shape of the object of a certain object class consistent with 2D images of the object using one or more images where 2D features are detected and using a learned statistical multi-view shape model of the shape variation; and
- an instruction set for comparing the recovered 3D shape with a reference representation of at least one object of the object class.

The computer program may further comprise an instruction set for identifying and/or verifying an individual object of an object class or aiding in the identification and/or verification of the individual object using the recovered 3D shape.

In another embodiment of the present invention, a system for object recognition of a three dimensional (3D) object is presented, comprising:
- means for obtaining at least one two dimensional (2D) representation of the object;
- means for detecting image features in the obtained 2D representation;
- means for recovering a highly probable 3D shape of the object of a certain object class consistent with 2D images of the object using one or more images where 2D features are detected and using a learned statistical multi-view shape model of the shape variation;
- means for comparing the recovered 3D shape with a reference representation of at least one object of the object class; and
- means for responding to a result from the means for comparison.

The system may further comprise means for identifying and/or verifying an individual object of an object class or aiding in the identification and/or verification of the individual object using the recovered 3D shape.

In the system the reference representation may be stored in at least one of a non-volatile memory, database server, and personal identification card.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF THE INVENTION

The invention consists of an image processing system for automatic recovery of 3D shape from images of objects belonging to a certain class. This 3D reconstruction is done by establishing a statistical shape model, denoted the feature model, that 3D positions. Such a model is learned, i.e. the model parameters are estimated, from training data where the 2D-3D correspondence is known. This learning phase may be done using any appropriate system for obtaining such 2D-3D correspondence, including, but not limited to binocular or multi-view image acquisition systems, range scanners or similar setups. In this process the object of interest is measured and a reference model of the object is obtained which may be used in subsequent image analysis as will be described below.

Figure 1A:
FIGS. 1a-1c illustrate a two-step procedure for recovering 3D data from an input image.
Figure 1B:
Figure 1C:
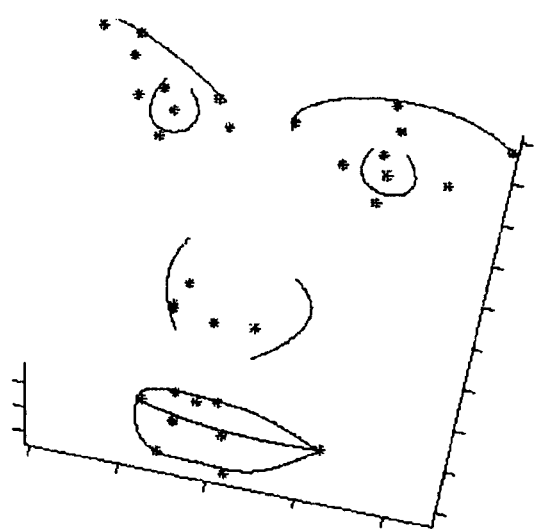

Given an input image, the process of recovering the 3D shape is a two-step procedure. First the image features such as points, curves and contours are found in the images e.g. using techniques such as e.g. ASM [1] or gradient based methods or classifiers such as SVM. Then the 3D shape is inferred using the learned feature model. This is illustrated in FIG. 1. FIG. 1a illustrates an image of a face to be analysed, FIG. 1b illustrates the detection of object features to be used in the analysis and shape information process, and FIG. 1c illustrates the inferred 3D shape to be used in the recognition process.

Figure 2A:
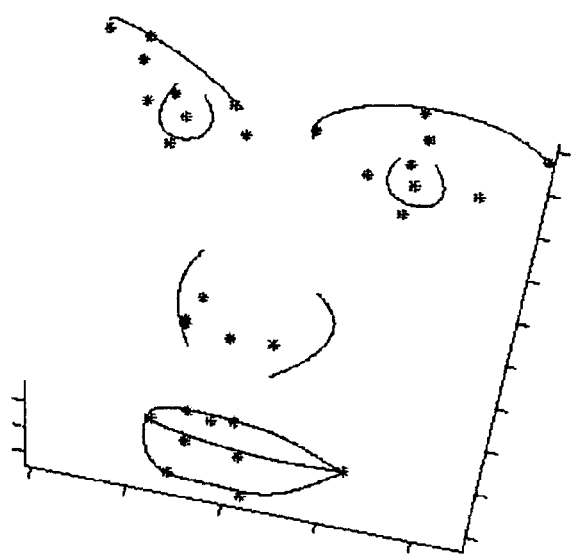
FIGS. 2a-2c illustrate a process of surface fitting to a recovered 3D shape.
Figure 2B:
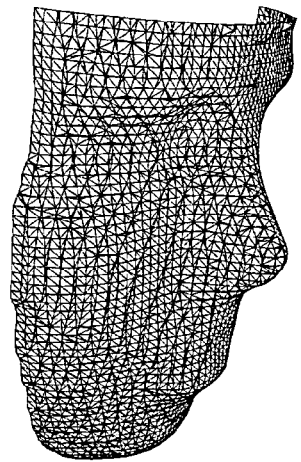
Figure 2C:
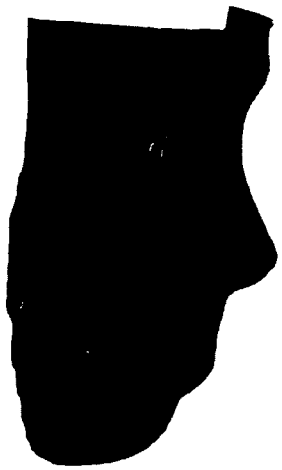

There is also the option of extending the 3D shape representation from curves and points to a full surface model by fitting a surface to the 3D data. This is illustrated in FIG. 2, where FIG. 2a illustrates the inferred 3D shape, 2b illustrates a fitted surface to the 3D data, and FIG. 2c illustrates a 3D rendered surface model of the fitted surface.

The Feature Model

Suppose we have a number of elements in a d-dimensional vector t, for example, a collection of 3D points in some normalized coordinate system. The starting point for the derivation of the model is that the elements in t can be related to some latent vector u of dimension q where the relationship is linear:

$$t = Wu + \mu \quad (1)$$

where W is a matrix of size d×q and $\mu$ is a d-vector allowing for non-zero mean. Once the model parameters W and $\mu$ have been learned from examples, they are kept fix. However, our measurements take place in the images, which usually is a non-linear function of the 3D features according to the projection model for the relevant imaging device.

Denote the projection function with f: $R^d \to R^e$, projecting all 3D features to 2D image features, for one or more images. Also, we need to change coordinate system of the 3D features to suit the actual projection function. Denote this mapping by T: $R^d \to R^d$. Typically, T is a similarity transformation of the world coordinate system. Thus, f(T(t)) will project all normalised 3D data to all images. Finally, a noise model needs to be specified. We assume that the image measurements are independent and normally distributed, likewise, the latent variables are assumed to be Gaussian with unit variance u~N(0,I). Thus, in summary:

$$t_{2D} = f(T_i(t)) + \epsilon = f(T(Wu + \mu)) + \epsilon \quad (2)$$

where $\epsilon \sim N(0, \sigma^2 I)$ for some scalar $\sigma$. The model is related to PPCA, cf. Tipping and Bishop ([5]: Tipping M. E., Bishop C. M., Probabilistic *Principal Component Analysis*, Phil. Trans. Royal Soc. London B, 61(3), p. 611-622, 1999.), but there are also differences due to the non-linearity of f(.). Before the model can be used, its parameters need to be estimated from training data. Given that it is a probabilistic model, this is best done with maximum likelihood (ML). Suppose we are given n examples $\{t_{2D,i}\}_{i=1}^n$, the ML estimate for W and $\mu$ is obtained by minimizing:

$$\sum_{i=1}^{n} \left( \frac{1}{\sigma^2} \|t_{2D} - f(T_i(u_i))\|^2 + \|u_i\|^2 \right) \quad (3)$$

over all unknowns. The standard deviation $\sigma$ is estimated a priori from the data. Once the model parameters W and $\mu$ have been learned from examples, they are kept fix. In practice, to minimize (3) we alternatively optimize over (W, $\mu$) and $\{u_i\}_{i=1}^n$ using gradient descent. Initial estimates can be obtained by intersecting 3D structure from each set of images and then applying PPCA algorithms for the linear part. The normalization $T_i(.)$ is chosen such that each normalized 3D sample has zero mean and unit variance.

There are three different types of geometric features embedded in the model.

Points: A 3D point which is visible in m>1 images will be represented in the vector t with its 3D coordinates (X,Y,Z). For points visible in only one image, m=1, no depth information is available, and such points are represented similarly to apparent contour points.

Curves: A curve will be represented in the model by a number of points along the curve. In the training of the model, it is important to parameterize each 3D curve such that each point on the curve approximately corresponds to the same point on the corresponding curve in the other examples.

Apparent contours: As for curves, we sample the apparent contours (in the images). However, there is no 3D information available for the apparent contours as they are view-dependent. A simple way is to treat points of the apparent contours as 3D points with a constant, approximate (but crude) depth estimate.

Finding Image Features

In the on-line event of a new input sample, we want to automatically find the latent variables u and, in turn, compute estimates of the 3D features t. The missing component in the model is the relationship between 2D image features and the underlying grey-level (or colour) values at these pixels. There are several ways of solving this, e.g. using an ASM (denoted the grey-level model) or detector based approaches.

The Grey-Level Model

Again, we adopt a linear model (PPCA). Using the same notation as in (1), but now with the subscript gl for grey-level, the model can be written $$t_{gl} = W_{gl}\mu_{gl} + \mu_{gl} + \epsilon_{gl} \quad (4)$$

where $t_{gl}$ is a vector containing the grey-level values of all the 2D image features and $\epsilon_{gl}$ is Gaussian noise in the measurements. In the training phase, each data sample of grey-levels is normalized by subtracting the mean and scaling to unit variance. The ML-estimate of $W_{gl}$ and $\mu_{gl}$ is computed with the EM-algorithm [5].

Detector-Based Methods

Image interest points and curves can be found by analyzing the image gradient using e.g. the Harris corner-detector. Also, specially designed filters can be used as detectors for image features. By designing the filters so that the response for certain local image structures are high, image features can be found using a 2D convolution.

Classification Methods

Using classifiers such as SVM, image regions can be classified as corresponding to a certain feature or not. By combining a series of such classifiers, one for each image feature (points, curves, contours etc.) and scanning the image at all appropriate scales the image features can be extracted. Examples can be e.g. an eye detector for facial images.

Deformable Models

Using a deformable model such as the Active Contour Models, also called snakes, of a certain image feature is very common in the field of image segmentation. Usually the features are curves. The process is iterative and tries to optimize an energy function. An initial curve is deformed gradually to the best fit according to an energy function that may contain terms regulating the smoothness of the fit as well as other properties of the curve.

Surface Fitting to the 3D Data

Once the 3D data is recovered, a surface model can be fitted to the 3D structure. This might be desirable in case the two-step procedure above only produces a sparse set of features in 3D space such as e.g. points and space curves. Even if these cues are characteristic for a particular sample (or individual), it is often not enough to infer a complete surface model, and in particular, this is difficult in the regions where the features are sparse. Therefore, a 3D surface model consisting of the complete mean surface is introduced. This will serve as a domain-specific, i.e. specific for a certain class of objects, regularizer. This approach requires that there is dense 3D shape information available for some training examples in the training data of the object class obtained from e.g. laser scans or in the case of medical images from e.g. MRI or computer tomography. From these dense 3D shapes, a model can be built separate from the feature model above. This means that, given recovered 3D shape, in the form of points and curves, from the feature model, the best dense shape according to the recovered 3D shape can be computed. This dense shape information can be used to improve surface fitting.

To illustrate with an example, consider the case of the object class being faces. The model is then learned using e.g. points, curves and contours in images together with the true 3D shape corresponding to these features obtained from e.g. multi-view stereo techniques. A second model is then created and learned using e.g. laser scans of faces, giving a set of face surfaces. This second model can be used to find the most probable (or at least highly probable) mean face surface (according to the second model) corresponding to the features or the recovered 3D shape. A surface can then be fitted to the 3D shape with the additional condition that where there is no recovered 3D shape, the surface should resemble the most probable mean face surface.

As a second example, consider the case of the object class being a particular blood vessel, e.g. the aorta. The model is then learned using e.g. curves and contours in images together with the true 3D shape obtained as e.g. a 3D MRI image. From the true 3D shapes a second model is learned comprising of the surface of the aorta. Then the most probable (or highly probable) aorta surface can be recovered from the image features or from the 3D shape recovered by the primary shape model.

The method provides the most probable or an at least highly probable 3D shape, in many applications this is sufficient and the identification and/or verification process is not necessary for the final application.

Figure 3:
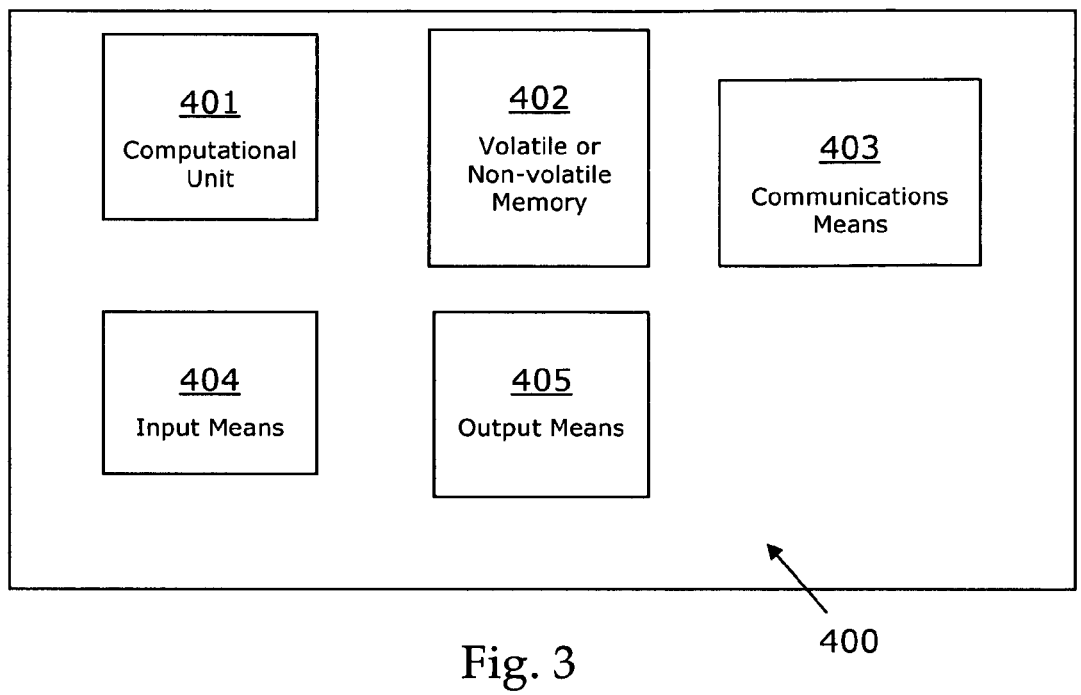
FIG. 3 is a schematic block diagram of a device according to the present invention.

We have now described the underlying method used for verification and/or identification purposes. Referring now to FIG. 3 a description of a device 400 implementing the preferred method according to the present invention will be given. Such a device 400 may be any appropriate type of computational device such as, but not limited to, a personal computer (PC), workstation, embedded computer, or stand alone device with a computational unit 401, such as a microprocessor, DSP (digital signal processor), FPGA (field programmable gate array), or ASIC (application specific integrated circuit). The device 400 has some input means 404 for obtaining images for analysis and final identification and/or verification. The input means 404 may be of any suitable communication interface depending on image type and include, but is not limited to, USB (universal serial bus), frame grabber, Ethernet, or Firewire. Image data is transferred to a computational unit 401 wherein software for execution of the above described method according to the present invention resides. The device 400 may further comprise some volatile or non-volatile memory 402 containing information related to a reference material for comparison and/or analysis purposes, e.g. known 2D-3D relationships of objects of interest. The device 400 may still further comprise communication means 403 for communicating with other computational devices over e.g. a network protocol (such as Ethernet or similar protocols) and output means 405 for outputting results to for instance a screen for convenient viewing or to a control device (not shown) for controlling an external process wherein the objects of interest are part of. Such processes may include, but is not limited to, industrial production processes where objects may be selected or deselected depending on the result from the identification and/or verification method according to the present invention, security processes again for selection or deselection purposes in for instance airport security systems for examination of the contents of suitcases, bags or other luggage equipment, or medical applications where the recovered 3D shape may be used e.g. for navigation of instruments or medical devices.

Figure 4:
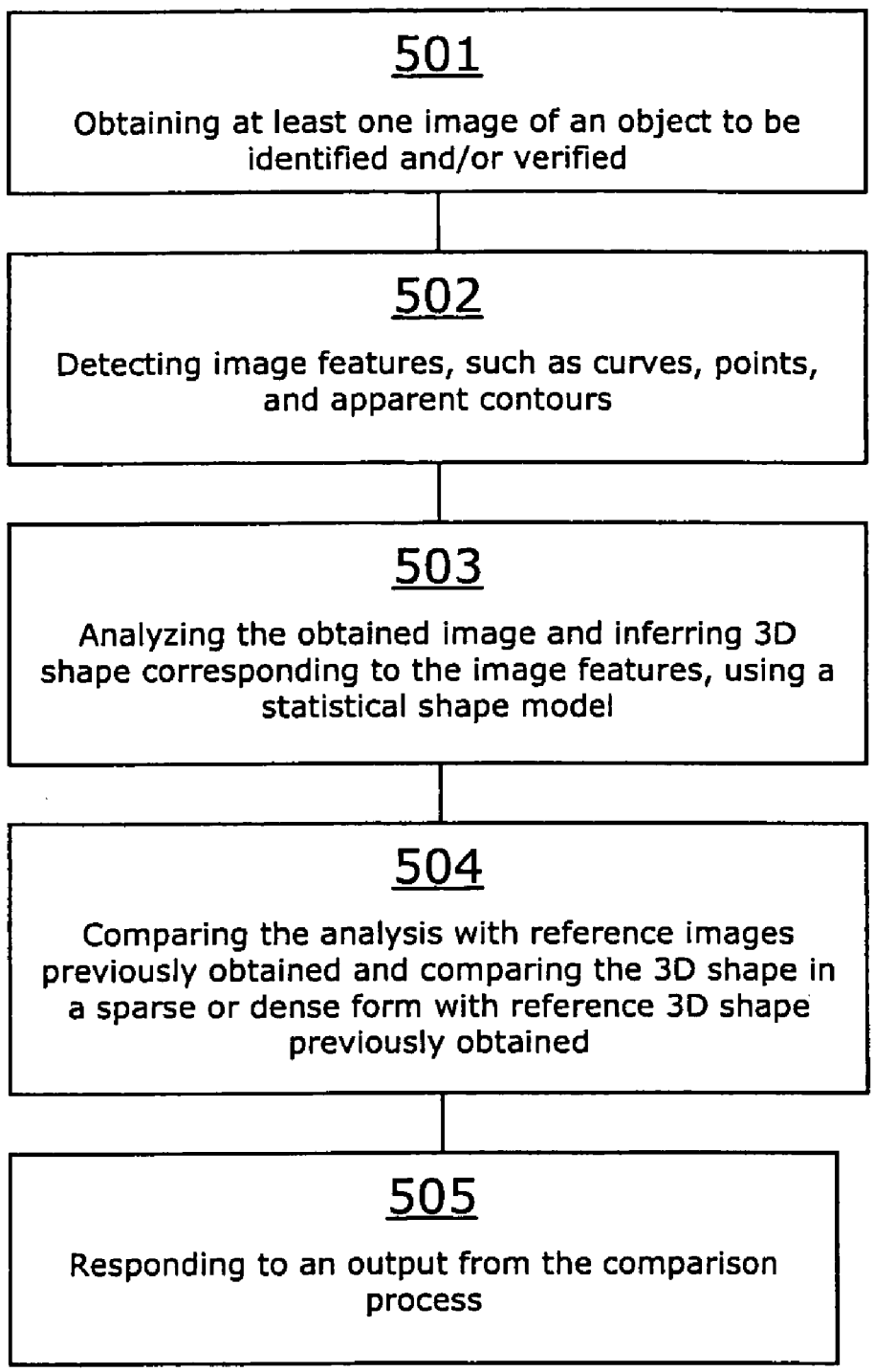
FIG. 4 illustrates a schematic block diagram of the steps of a method according to the present invention.

The method for object recognition according to the present invention may be illustrated using FIG. 4. The method may comprise the following steps:
1. Obtaining at least one image of an object to be identified and/or verified (501);
2. Detecting image features, such as curves, points, and apparent contours (502).
3. Analysing the obtained image and inferring 3D shape corresponding to the image features, using a statistical shape model (503);

4. Comparing the analysis with reference images previously obtained and comparing the 3D shape in a sparse or dense form with reference 3D shape previously obtained (504); and
5. Responding to an output from the comparison process (505).

Figure 5:
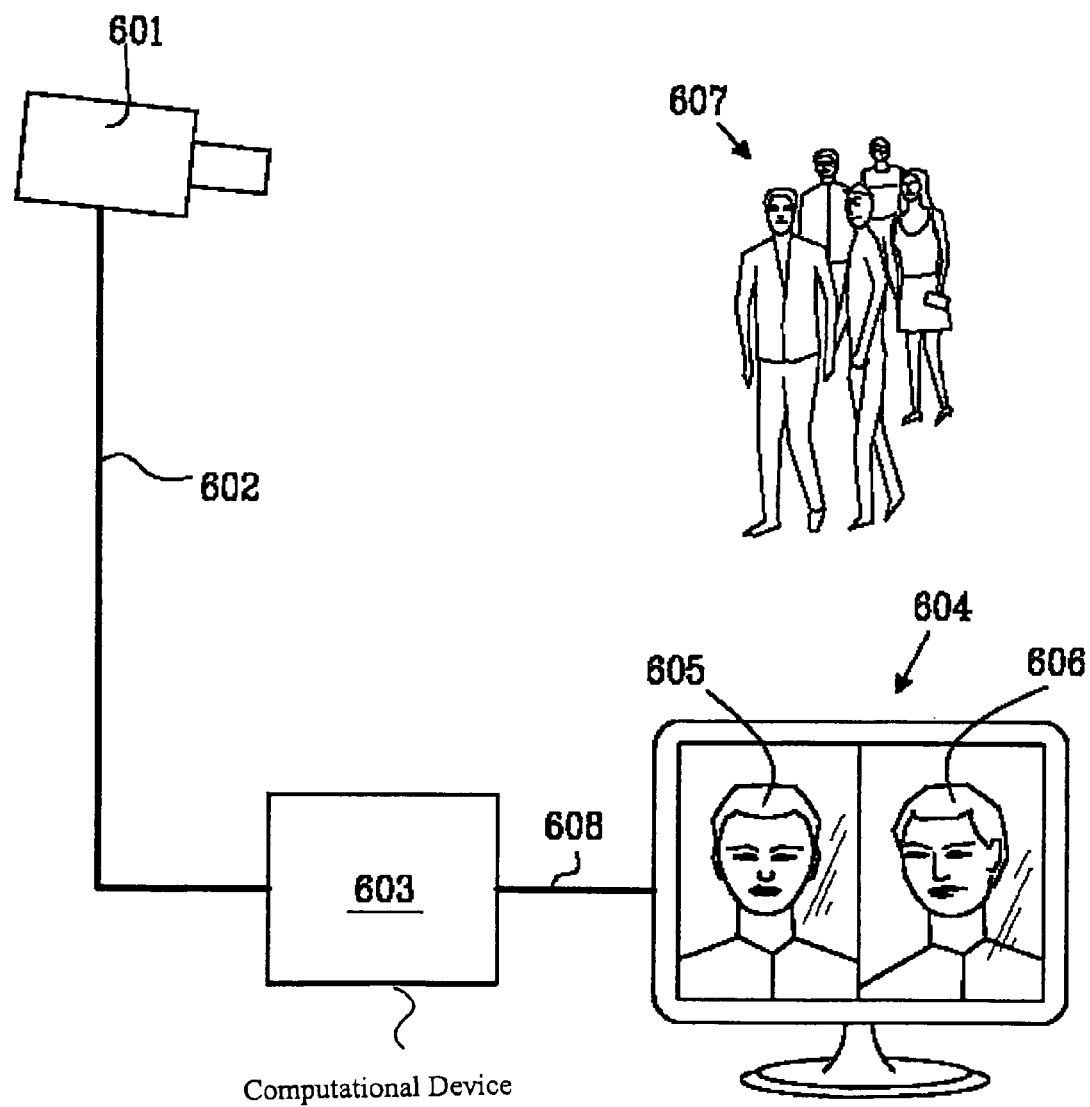
FIG. 5 is a schematic illustration of a system according to the present invention.

In another embodiment of the present invention a system is used for obtaining images, analyzing, and responding to results from the identification and/or verification process, as may be seen in FIG. 5. Such a system may include at least one image acquisition device 601 or any other device or unit for obtaining a representation of the object 607, a computational device 400, 603 as described above, and some type of responsive equipment such as e.g. the industrial process equipment or the security process equipment described above. At least one image acquisition device 601 is used for acquiring one or more images (or 2D representation) which are transferred 602 to the computational device 603 for analysis and verification and/or identification. The result from this process is transmitted to a control system or display system 604. In the case of a face detection system at least one image of a person is obtained, for instance the face of the person, and the image or images are transmitted to the computational device 603, using any suitable communication means 602 (wired or wireless), for analysis and comparison of the acquired image or images with data obtained from reference measurements for example with known 2D-3D relationships; however, comparison may be made between an inferred 3D shape with a stored 3D reference data or between a 2D surface model with a stored 2D reference surface model. The result may be made available through for instance a display unit 604 and may for illustrative purposes be displayed with both a reference image 605 and the obtained image 606 or images rendered from the recovered 3D shape as shown in FIG. 5. It should be appreciated by the person skilled in the art that the image acquisition system and/or display/control system may be incorporated with the computational device forming an integral unit and that the result may be displayed in any suitable manner and is not limited to the above described example. Instead of transferring the result to a display unit 604 it may be used in any suitable control process for controlling e.g. an alarm, an entrance system, control gate, toll gate, and so on.

Some of the benefits the present invention contributes to the technical field may be illustrated with the following list:
Any number of images, even as few as a single image, may be used to automatically recover the 3D shape of an object in the object class.
A statistical multi-view model that represents 2D and 3D data consistently.
The process is automatic and computationally efficient.
The process is robust to illumination and specular reflections which is a problem for 3D reconstruction methods based on image correlation or photo-consistency.
Surfaces can be fitted to the 3D structure using domain specific regularizers learned from statistical shape models.

The flexibility of the present invention may be illustrated with the following list:
The statistical shape model may be used for any class of objects and the projection of these objects in images.
The approach may be used for any kind of imaging device (camera, X-ray, multi-spectral, thermal, etc.).
The invention may be used with any number of imaging devices (one or more).
The invention includes the possibility of combining many different techniques for establishing 2D to 3D correspondence (image acquisition systems, range scanners, stereo image systems, multi-view stereo image systems, X-ray etc.)
The invention includes the possibility of using different techniques, such as ASM, gradient based methods or deformable models, for finding the image features.
If the object class contains non-rigid objects, the invention includes the possibility to establish 2D to 3D models for different deformations of the object (e.g. different facial expressions).
The invention includes the possibility of using a statistical shape model for surface fitting to the recovered 3D shape.

The reference representations of objects may be stored in several different locations and with different types of systems, such as, but not limited to, locally on some non-volatile memory in a device utilizing the object recognition according to the present invention, in a centralized server, e.g. a database server, or a personal identification card containing a reference representation of an object such as a person and this identification card may be used in for instance an access system. Communication between an object recognition system and a reference representation storage system may be utilized with different types of security levels and/or schemes, such as RADIUS, DIAMETER, SSL, SSH, or any other encrypted communication system as understood by the person skilled in the art.

Possible application areas for the above described invention range from object identification and verification in industrial processes, determining and/or identifying objects for security reasons, object recognition for military purposes, e.g. automatic determination of military vehicles, military ships, aircrafts, and so on, face recognition systems for many different applications, e.g. biometrics, information security, law enforcement, smart cards, access control and so on.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method for object recognition of a three dimensional (3D) object, the method comprising
at an electronic device, maintaining a statistical 3D-shape model used to express 3D-shapes of object features in terms of a median 3D-shape, $\mu$, and a base of 3D-shapes, W, where each 3D-shape, $t_{3D}(i)$, is expressed in terms of an associated latent characteristic, $u(i)$, as $t_{3D}(i)=W*u(i)+\mu$, where 3D-shape vectors $t_{3D}$ and $\mu$ are d-dimensional, a matrix of the base of 3D-shapes is (d×q)-dimensional, and latent characteristic vectors u are q-dimensional, and where the object features include points, lines and contours corresponding to objects of an object class;
accessing a profile corresponding to at least a known object of the object class, the profile stored on persistent storage communicatively coupled with the electronic device, the profile including a latent characteristic, $u(k)$, associated with a 3D-shape, $t_{3D}(k)$, of the known object, in accordance with the statistical 3D-shape model, $t_{3D}(k)=W*u(k)+\mu$;
detecting, by the electronic device, object features, $t_{2D}(o)$, of an object depicted in a two dimensional (2D) image, where a vector, $t_{2D}$, representing representation of said detected object features is e-dimensional;

determining, by the electronic device, a 3D-shape, $t_{3D}(o)$, corresponding to the detected object features, $t_{2D}(o)$, such that a projection model $f(t_{3D})$ applied to the determined 3D-shape, $t_{3D}(o)$, results in the detected object features $t_{2D}(o)=f[t_{3D}(o)]$, said determining the 3D-shape, $t_{3D}(o)$, comprising:

optimizing the projection model, $f[t_{3D}(i)]$, applied to 3D-shapes, $t_{3D}(i)$, expressed in terms of respective latent characteristics, $u(i)$, in accordance with the statistical 3D-shape model, $t_{3D}(i)=W*u(i)+\mu$, said optimizing over the respective latent characteristics $u(i)$, and selecting a latent characteristic $u(o)$ corresponding to the optimized projection model, $f[t_{3D}(o)]$, such that the optimized projection model applied to a 3D shape expressed in terms of the selected latent characteristic, $u(o)$, results in the detected object features $t_{2D}(o)=f[W*u(o)+\mu)]$, where the 3D-shape expressed in terms of the selected latent characteristic, $u(o)$, represents the determined 3D-shape, $t_{3D}(o)$;

comparing, by the electronic device, the selected latent characteristic $u(o)$, corresponding to the detected object features, $t_{2D}(o)$, at least with the latent characteristic included in the stored profile, $u(k)$, and associated with the 3D-shape, $t_{3D}(k)$, of the known object;

selectively recognizing the object depicted in the 2D image as the known object based on said comparing.

2. The method according to claim 1, wherein said object class is a part of a human body.

3. The method according to claim 2, wherein said object class is a human face.

4. The method according to claim 1, wherein said object class contains non-rigid objects and said statistical 3D-shape model, $t_{3D}=W*u+\mu$, is learned using 2D and 3D data specific for possible deformations of objects in said non-rigid object class.

5. The method according to claim 1, wherein the object of an object class is an inner organ of a human body.

6. The method according to claim 1, wherein the object of an object class is a tumor.

7. The method according to claim 1, said determining the 3D-shape, $t_{3D}(o)$, further comprises fitting a surface to said 3D-shape associated with the selected latent characteristic, $u(o)$, by using a learned statistical shape model for said surface of the object in order to regularize said surface of the 3D-shape associated with the selected latent characteristic, $u(o)$, in a manner specific for said object class.

8. The method according to claim 1, wherein said object class is a vehicle.

9. The method according to claim 1, wherein said persistent storage is included on a personal identification card.

10. A device for object recognition of a three dimensional (3D) object, the device comprising:

a memory configured to store a statistical 3D-shape model used to express 3D-shapes of object features, the statistical 3D-shape model consisting of a median 3D-shape, $\mu$, and a base of 3D-shapes, $W$, where each of the 3D-shapes, $t_{3D}(i)$, is expressed in terms of an associated latent characteristic, $u(i)$, as $t_{3D}(i)=W*u(i)+\mu$, where 3D-shape vectors $t_{3D}$ and $\mu$ are d-dimensional, a matrix of the base of 3D-shapes is (d×q)-dimensional, and latent characteristic vectors $u$ are q-dimensional, and where the object features include points, lines and contours corresponding to objects of an object class;

a data processor configured to retrieve a profile corresponding to at least a known object of the object class, where the profile is stored on persistent storage communicatively coupled with the device, the profile including a latent characteristic, $u(k)$, associated with a 3D-shape, $t_{3D}(k)$, of the known object, in accordance with the statistical 3D-shape model, $t_{3D}(k)=W*u(k)+\mu$, detect object features, $t_{2D}(o)$, of an object depicted in a two dimensional (2D) image, where a vector, $t_{2D}$, representing detected object features is e-dimensional, determine a 3D-shape, $t_{3D}(o)$, corresponding to the detected object features, $t_{2D}(o)$, such that a projection model $f(t_{3D})$ applied to the determined 3D-shape, $t_{3D}(o)$, results in the detected object features $t_{2D}(o)=f[t_{3D}(o)]$, where to determine the 3D-shape, $t_{3D}(o)$, the data processor is further configured to;

optimize the projection model, $f[t_{3D}(i)]$, applied to 3D-shapes, $t_{3D}(i)$, expressed in terms of respective latent characteristics, $u(i)$, in accordance with the statistical 3D-shape model, $t_{3D}(i)=W*u(i)+\mu$, where the optimization is performed over the respective latent characteristics $u(i)$, and select a latent characteristic $u(o)$ corresponding to the optimized projection model, $f[t_{3D}(o)]$, such that the optimized projection model applied to a 3D-shape expressed in terms of the selected latent characteristic, $u(o)$, results in the detected object features $t_{2D}(o)=f[W*u(o)+\mu]$, where the 3D-shape expressed in terms of the selected latent characteristic, $u(o)$, represents the determined 3D-shape, $t_{3D}(o)$;

compare the selected latent characteristic, $u(o)$, corresponding to the detected object features, $t_{2D}(o)$, at least the latent characteristic included in the stored profile, $u(k)$, and associated with the 3D-shape, $t_{3D}(k)$, of the known object; and selectively recognize the object depicted in the 2D image as the known object based on said comparing.

11. The device according to claim 10, wherein said object class is a part of a human body.

12. The device according to claim 11, wherein said object class is a human face.

13. The device according to claim 10, wherein said object class contains non-rigid objects and said statistical 3D-shape model $t_{3D}=W*u+\mu$, is learned using 2D and 3D data specific for possible deformations of objects in said non-rigid object class.

14. The device according to claim 10, wherein the object class is an inner organ of a human body.

15. The device according to claim 10, wherein the object class is a tumor.

16. The device according to claim 10, where to determine the 3D-shape, $t_{3D}(o)$, the data processor is further configured to fit a surface to said 3D-shape associated with the selected latent characteristic, $u(o)$, by using a learned statistical shape model for said surface of the object in order to regularize said surface of the 3D-shape associated with the selected latent characteristic, $u(o)$, in a manner specific for said object class.

17. The device according to claim 10, wherein said object class is a vehicle.

18. The device according to claim 10 further comprising the persistent storage that stores the profile corresponding to at least the known object of the object class.

19. The device according to claim 10 further comprising an interface to communicate with a network-based storage system that stores the profile corresponding to at least the known object of the object class.

20. The device according to claim 10, further comprising:
an interface for communicating with a personal identification card wherein said profile corresponding to at least the known object of the object class is stored.

21. A non-transitory computer readable storage medium encoded with a computer program, the program comprising instructions that when executed in a computational unit for face recognition cause the computational unit to perform operations comprising:
maintaining a statistical three dimensional (3D) shape model used to express 3D-shapes of face features in terms of a median 3D-shape, $\mu$, and a base of 3D-shapes, W, where each 3D-shape, $t_{3D}(i)$, is expressed in terms of an associated latent characteristic, $u(i)$, as $t_{3D}(i)=W*u(i)+\mu$, where 3D-shape vectors $t_{3D}$ and $\mu$ are d-dimensional, a matrix of the base of 3D-shapes is (d×q)-dimensional, and latent characteristic vectors u are q-dimensional, and where the face features include points, lines and contours of faces;
accessing a profile corresponding to at least a known face, the profile including a latent characteristic, $u(k)$, associated with a 3D-shape, $t_{3D}(k)$, of the known face, in accordance with the statistical 3D-shape model, $t_{3D}(k)=W*u(k)+\mu$;
detecting face features, $t_{2D}(o)$, of a face depicted in a two dimensional (2D) image, where a vector, $t_{2D}$, representing said detected face features is e-dimensional;
determining a 3D-shape, $t_{3D}(o)$, corresponding to the detected face features, $t_{2D}(o)$, such that a projection model $f(t_{3D})$ applied to the determined 3D-shape, $t_{3D}(o)$, results in the detected face features $t_{2D}(o)=f[t_{3D}(o)]$, said determining the 3D-shape, $t_{3D}(o)$, comprising
optimizing the projection model, $f[t_{3D}(i)]$, applied to 3D-shapes, $t_{3D}(i)$, expressed in terms of respective latent characteristics, $u(i)$, in accordance with the statistical 3D-shape model, $t_{3D}(i)=W*u(i)+\mu$, said optimizing over the respective latent characteristics $u(i)$, and
selecting a latent characteristic $u(o)$ corresponding to the optimized projection model, $f[t_{3D}(o)]$, such that the optimized projection model applied to a 3D shape expressed in terms of the selected latent characteristic, $u(o)$, results in the detected face features $t_{2D}(o)=f[W*u(o)+\mu]$, where the 3D-shape expressed in terms of the selected latent characteristic, $u(o)$, represents the determined 3D-shape, $t_{3D}(o)$;
comparing the selected latent characteristic, $u(o)$, corresponding to the detected face features, $t_{2D}(o)$, at least with the latent characteristic included in the stored profile, $u(k)$, and associated with the 3D-shape, $t_{3D}(k)$, of the known face; and
selectively recognizing the face depicted in the 2D image as the known face based on said comparing.

22. The non-transitory computer readable storage medium according to claim 21, wherein said determining the 3D-shape, $t_{3D}(o)$, further comprises fitting a surface to said 3D-shape associated with the selected latent characteristic, $u(o)$, by using a learned statistical shape model for said surface of the face depicted in the 2D image in order to regularize said surface of the 3D-shape associated with the selected latent characteristic, $u(o)$, in a manner specific for faces.

23. A system for face recognition, the system comprising:
a storage system configured to store a statistical three dimensional (3D) shape model used to express 3D-shapes of face features, the statistical 3D-shape model including a median 3D-shape, $\mu$, and a base of 3D-shapes, W, where each 3D-shape, $t_{3D}(i)$, is expressed in terms of an associated latent characteristic, $u(i)$, as $t_{3D}(i)=W*u(i)+\mu$, where 3D-shape vectors $t_{3D}$ and $\mu$ are d-dimensional, a matrix of the base of 3D-shapes is (d×q)-dimensional, and latent characteristic vectors u are q-dimensional, and where the face features include points, lines and contours of faces;
a data processor configured to
retrieve a profile corresponding to at least a known face, where the profile is stored on storage system, the profile including a latent characteristic, $u(k)$, associated with a 3D-shape, $t_{3D}(k)$, of the known face, in accordance with the statistical 3D-shape model, $t_{3D}(k)=W*u(k)+\mu$,
detect face features, $t_{2D}(o)$, of a face depicted in a two dimensional (2D) image, where a vector, $t_{2D}$, representing said detected face features is e-dimensional,
determine a 3D-shape, $t_{3D}(o)$, corresponding to the detected face features, $t_{2D}(o)$, such that a projection model $f(t_{3D})$ applied to the determined 3D-shape, $t_{3D}(o)$, results in the detected face features $t_{2D}(o)=f[t_{3D}(o)]$, where to determine the 3D-shape, $t_{3D}(o)$, the data processor is further configured to
optimize the projection model, $f[t_{3D}(i)]$, applied to 3D-shapes, $t_{3D}(i)$, expressed in terms of respective latent characteristics, $u(i)$, in accordance with the statistical 3D-shape model, $t_{3D}(i)=W*u(i)+\mu$, where the optimization is performed over the respective latent characteristics $u(i)$, and
select a latent characteristic $u(o)$ corresponding to the optimized projection model, $f[t_{3D}(o)]$, such that the optimized projection model applied to a 3D shape expressed in terms of the selected latent characteristic, $u(o)$, results in the detected face features $t_{2D}(o)=f[W*u(o)+\mu]$, where the 3D-shape expressed in terms of the selected latent characteristic, $u(o)$, represents the determined 3D-shape, $t_{3D}(o)$,
compare the selected latent characteristic, $u(o)$, corresponding to the detected face features, $t_{2D}(o)$, at least with the latent characteristic included in the stored profile, $u(k)$, and associated with the 3D-shape, $t_{3D}(k)$, of the known face,
selectively recognize the face depicted in the 2D image as the known face based on said comparing, and
respond to a result from said selective recognition.

24. The system according to claim 23, where to determine the 3D-shape, $t_{3D}(o)$, the data processor is further configured to fit a surface to said 3D-shape associated with the selected latent characteristic, $u(o)$, by using a learned statistical shape model for said surface of the face depicted in the 2D image in order to regularize said surface of the 3D-shape associated with the selected latent characteristic, $u(o)$, in a manner specific for faces.

25. The system according to claim 23, wherein said statistical 3D-shape model, $t_{3D}=W*u+\mu$, is learned using 2D and 3D data specific for possible deformations of faces.

26. A method for face recognition, the method comprising:
at a computer system, maintaining a statistical 3D-shape model used to express 3D-shapes of face features in terms of a median 3D-shape, a base of 3D-shapes and respective latent characteristics of the 3D-shapes, where the face features include points, lines and contours of faces;
accessing a profile corresponding to at least a known face, the profile being stored on persistent storage communicatively coupled with the computer system, the profile including a latent characteristic associated with a 3D-shape of the known face, in accordance with the statistical 3D-shape model;

detecting, by the computer system, face features of a face depicted in a 2D image;

determining, by the computer system, a 3D-shape corresponding to the detected face features such that a projection model applied to the determined 3D-shape results in the face features detected in the 2D image, said determining the 3D-shape comprising optimizing the projection model applied to 3D-shapes expressed in terms of respective latent characteristics in accordance with the statistical 3D-shape model, said optimizing being performed over the respective latent characteristics, and selecting a latent characteristic corresponding to the optimized projection model, such that the optimized projection model applied to a 3D-shape expressed in terms of the selected latent characteristic results in the detected face features, where the 3D-shape expressed in terms of the selected latent characteristic represents the determined 3D-shape;

comparing, by the computer system, the selected latent characteristic corresponding to the detected face features at least with the latent characteristic included in the stored profile and associated with the 3D-shape of the known face; and selectively recognizing, by the computer system, the face depicted in the 2D image as the known face based on said comparing.

\* \* \* \* \*